(12) United States Patent
Timm et al.

(10) Patent No.: US 9,227,564 B2
(45) Date of Patent: Jan. 5, 2016

(54) LED STRIP LIGHTING DEVICE FOR A CABIN OF A PASSENGER AIRCRAFT

(71) Applicant: IDD Aerospace Corporation, Redmond, WA (US)

(72) Inventors: Birger Timm, Höhbeck (DE); Volker Antonczyk, Hamburg (DE); Henrik Heine, Hamburg (DE)

(73) Assignee: IDD Aerospace Corporation, Redmond, WA (US)

( * ) Notice: Subject to any disclaimer, the term of this patent is extended or adjusted under 35 U.S.C. 154(b) by 0 days.

(21) Appl. No.: 14/640,419

(22) Filed: Mar. 6, 2015

(65) Prior Publication Data

US 2015/0257224 A1 Sep. 10, 2015

Related U.S. Application Data

(60) Provisional application No. 61/949,700, filed on Mar. 7, 2014.

(51) Int. Cl.
| | |
|---|---|
| H05B 37/02 | (2006.01) |
| B60Q 3/02 | (2006.01) |
| B64D 11/00 | (2006.01) |
| F21K 99/00 | (2010.01) |
| H05B 33/08 | (2006.01) |
| B64D 47/02 | (2006.01) |
| F21Y 101/02 | (2006.01) |
| F21W 101/06 | (2006.01) |

(52) U.S. Cl.
CPC ............... *B60Q 3/02* (2013.01); *B60Q 3/0259* (2013.01); *B64D 11/00* (2013.01); *B64D 11/0015* (2013.01); *B64D 47/02* (2013.01); *F21K 9/30* (2013.01); *H05B 33/086* (2013.01); *H05B 33/0824* (2013.01); *H05B 33/0845* (2013.01); *B64D 2011/0038* (2013.01); *F21W 2101/06* (2013.01); *F21Y 2101/02* (2013.01)

(58) Field of Classification Search
CPC ............. G02B 6/0068; G02B 19/0066; G02B 6/0073; G02F 1/133603; G02F 2001/133618; G02F 1/1336
See application file for complete search history.

(56) References Cited

U.S. PATENT DOCUMENTS

| | | | |
|---|---|---|---|
| 2008/0164823 A1* | 7/2008 | Huang | H05B 33/086 315/150 |
| 2009/0040674 A1* | 2/2009 | Roberts | G09G 3/3406 361/78 |
| 2011/0018465 A1* | 1/2011 | Ashdown | H05B 33/0818 315/294 |

\* cited by examiner

*Primary Examiner* — Douglas W Owens
*Assistant Examiner* — Monica C King
(74) *Attorney, Agent, or Firm* — Kilpatrick Townsend & Stockton LLP; Dean W. Russell, Esq.; Renae Bailey Wainwright, Esq.

(57) ABSTRACT

The invention relates to a LED strip lighting device for a cabin of a passenger aircraft, the device comprising at least one LED strip, comprising a plurality of N independently controllable LED segments (S), wherein each LED segment (S) comprises at least four LED selected from red, green, blue, ice blue, warm white and cold white or another type of LED; a plurality of M driver units, wherein each LED section (S) is connected to a driver unit for providing a control signal to the respective LED section (S); and a bus system connecting all M driver units. The device further comprises a micro controller connected to the bus system for providing control signals for each driver unit, such that each LED segment (S) emits light in intensity and color according to a predetermined illumination pattern.

14 Claims, 3 Drawing Sheets

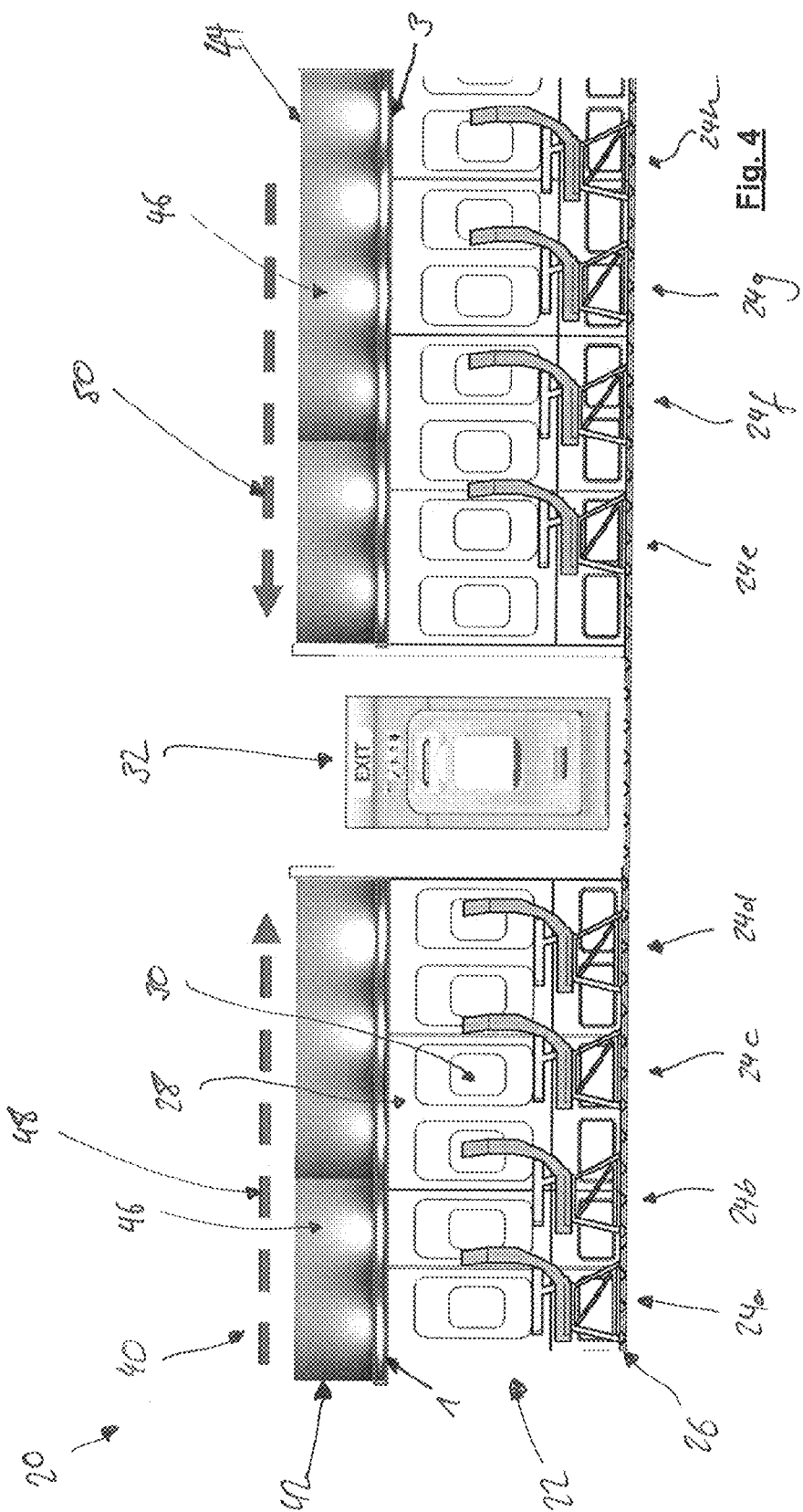

LED STRIP LIGHTING DEVICE FOR A CABIN OF A PASSENGER AIRCRAFT

CROSS-REFERENCE TO RELATED APPLICATION

This application claims the benefit of U.S. Provisional Application Ser. No. 61/949,700, filed Mar. 7, 2014, titled "Aircraft Cabin Light Systems," the entire contents of which are hereby incorporated by reference.

TECHNICAL FIELD

The invention relates to an LED strip lighting device for a cabin of a passenger aircraft, a passenger aircraft having an aircraft cabin, a method for controlling an LED strip lighting device which is arranged in the passenger cabin of a passenger aircraft, and a software product for a micro controller of an LED strip lighting device.

The invention relates to RGBW LED light strip based systems which support the control of light strips combined to "control groups" or a separate control of each single light strip, using a certain bus system. The smallest controllable unit in these systems is the light strip itself.

BACKGROUND

In general it is known to illuminate the cabin of a passenger aircraft for generally providing light. It is further known to adapt this light to special moods, for example changing color or intensity of the light to adapt the interior illumination to specific flight situations or passenger wishes. From US 2015/0008282 of Zodiac Aerotechnics, for example, a system is known which comprises a display device for an aircraft cabin, comprising a display adapted to display a plurality of stars. This device simulates a starry sky at a cabin roof portion. Furthermore it is disclosed that such a display device is arranged at wall sections of the aircraft cabin and that the aircraft cabin or compartment comprises a plurality of wall sections and a plurality of light emitting means for individually illuminating each wall section, wherein said wall sections and said light emitting means form such a display device. Such a display, again, is adapted to display a plurality of stars. Therefore the starry sky also is shown at wall sections of the aircraft cabin.

Such a system however is complex and can hardly be used for other purposes. Furthermore it is difficult to retrofit such a system.

Therefore, the invention seeks to provide an LED strip lighting device for a cabin of a passenger aircraft, a passenger aircraft, a method and a corresponding software product, which provides an illumination device which is usable for different purposes, in particular which is usable for safety purposes and which can be retrofitted in existing aircrafts.

SUMMARY

According to a first aspect of the invention the problem solved by an LED strip lighting device for a cabin of a passenger aircraft according to claim 1, wherein the LED strip lighting device comprises at least one LED strip, comprising a plurality of N independently controllable LED segments, wherein each LED segment comprises at least four, preferably five, six or more LED selected from red, green, blue, ice blue, warm white and cold white or an other type of LED; a plurality of M driver units, wherein each LED section is connected to a driver unit for providing a control signal to the respective LED section; a bus system connecting all M driver units; and a micro controller connected to the bus system for providing control signals for each driver unit, such that each LED segment emits light in intensity and color according to a predetermined illumination pattern. It is to be understood, that an LED segment may have more than four or five LED, in particular one LED segment may have six LEDs, seven LEDs or more than seven LEDs. The LED in one LED segment may be selected from different types of LEDs wherein each LED in such an LED segment is different from the other LEDs in said segment. Further, an LED segment may comprise two or more identical LEDs to allow an intensification of a particular lighting effect by said two or more identical LEDs. It is particularly preferred to have six different LEDs in each LED segment, wherein said LEDs are red, green, blue, ice blue, warm white and cold white, An LED strip according to the invention is a substantially straight strip comprising a plurality of LED segments. Each segment is a portion of the strip. The strip may be formed of one single row of LEDs, but may also comprise a number of LEDs adjacent to each other in a direction perpendicular to the strip. For example the strip may have substantially the length of the whole aircraft cabin, and a width which may be in the range of 0.5 inch/1.27 cm to for example 2 inch/5.08 cm. Such a strip may for example be arranged at a floor portion of the passenger cabin, in particular on left and right end portions of the floor, close to the seats. Additionally or alternatively, such strips may also be arranged at side wall portions, ceiling portions, or portions of luggage compartments.

According to the invention the at least one LED strip comprises a plurality of N independently controllable LED segments and each segment is connected to a driver unit. Therefore, each segment has its own driver unit which provides a respective control signal to the LED. Such a control signal preferably is a pulse width modulated signal (PWM signal). The driver unit may be formed as an integrated circuit, like e.g. a TCL® driver IC available from Texas Instruments. Such an arrangement provides a decentralized system for driving the LEDs which reduces wiring and weight, which is particularly preferred in aircraft applications. The at least one red, one green and one blue, and optionally one or more other LED like e.g. one ice blue, warm white, cold white or an other type of LED in each segment can be formed as a single RGBW LED chip or an RGB chip and a white chip, or four, five or six single chips, respectively.

Generally, the LED strip lighting device comprises a number of N LED segments controlled by a number of M driver units. N might be equal to M such that each LED segment is controlled by one single driver unit, respectively. In other configurations, M might be smaller than N, e.g. N might be two times, three times or four times M, In such case, each driver unit controls two, three, or four LED segments, respectively. Preferably, N is an integral multiple of M.

Furthermore, all driver units are connected via a bus system to each other and to a micro controller. The micro controller is adapted to control the whole LED strip and provides higher level signals to each driver unit. The bus system is preferably formed as an internal serial peripheral interface bus (SPI bus). This also reduces wiring, since not every single driver unit is connected to the micro controller separately; they are all arranged on the same bus.

The micro controller provides control signals for each driver unit, such that each LED segment emits light in intensity and color according to a predetermined illumination pattern. Such illumination pattern preferably is stored in a respective storing device at the micro controller, or may be received by a micro controller via a central control unit via standard serial I/O protocol. Such illumination pattern may comprise specific sequences for illuminating each independently controllable LED segment according to a predetermined color and intensity for a predetermined time. Due to this, it is possible to use the LED strip lighting device in a plurality of different applications for displaying different illumination patterns in dependency on different flight situations or passenger moods.

According to a preferred embodiment, the LED strip lighting device further comprises a status monitoring bus, which connects all LED segments with the micro controller. The status monitoring bus is preferably formed as an internal monitoring of TCL driver status via SPI bus, in particular for failure detection. The status monitoring bus connects all driver units with the micro controller, such that the micro controller receives a feedback of the status and failure modes of single LED segments. In dependency on this status, the micro controller may be adapted to adapt or change the illumination pattern to comply with the status of the LED segments.

According to a further preferred embodiment, the illumination pattern is subsequently controlling each LED segment to emit light having a predetermined intensity and color and to stop emitting light when an adjacent LED segments emits a light, so that an appearance of a moving light spot along the LED strip is achieved. It is particularly preferred to control the LED segments in such a way that the appearance of a plurality of moving light spots in distance to each other is achieved. This is realized in that the LED segments are activated and deactivated for a short period of time such that an upstream LED segment is activated shortly before an adjacent downstream LED segment, wherein the frequency of activation of said LED segments is lower than the length of the LED strip divided by the time for a single spot running along the strip. Preferably the micro controller controls each LED segment according to such an illumination pattern. Such illumination pattern can be referred to as a "guidance function illumination pattern". By providing the appearance or illusion of a moving light spot along the LED strip, passengers may be guided into specific directions. The moving spot indicates intuitively a direction to which the passenger should move. For example such a moving spot may be used during boarding and de-boarding. Additionally this moving light spot may be used in emergency situations to indicate the shortest path to an emergency exit. Furthermore it is possible to adapt the speed of the moving light spot and also color and intensity dependent on the situation. For example during boarding and de-boarding, the light spot may move slowly and in a calm manner, preferably provided in a calm color, like a light green. In emergency situations, the color of the spot may change to orange or red and may move faster. Turning on and off different sections of the LED light strip alternatingly creates the imagination of a running light spot or running light spots. Due to this embodiment, safety of an aircraft comprising such an LED strip lighting device is enhanced and also boarding and de-boarding time may be reduced which also reduced airplane on ground time.

According to a further preferred embodiment, the micro controller is provided with passenger seat information of the aircraft and the micro controller is adapted to control the driver units dependent on the received passenger information. For example the micro controller is connected to a board system which receives information of buttons or switches used by passengers to call a cabin attendant. When a passenger seated on a specific seat presses this button, a signal is provided to the micro controller which provides a respective signal to the respective drive unit, for causing the respective LED segment to change emitted light color or emitted light intensity. For example, the whole light strip may emit a blue color with low intensity in an idle state. When a button for calling a cabin attendant is pressed, the respective LED segment or LED segments which are associated with the respective seat, either below, adjacent or above the LED light strip, is caused to emit for example an orange color light with a higher intensity. Alternatively or additionally the respective LED segment or LED segments may also blink on and off mode, or in a dimmed wave form pattern. This also decreases time for the cabin attendant to identify the respective seat and passenger which requires attention. Furthermore, such passenger seat information can also comprise information regarding specific food requirements, for example vegetarian meals or kosher meals. Each special meal may be associated with a color and while the meals are delivered, the respective LED segment is controlled accordingly. The width of the section emitting light, having one or more LED segments, is variable as well as the color and intensity. In addition, dynamic effects like pulsation or moving effects can be combined with this functionality. Different colors can be used to show different information or can be used for branding purposes.

Further illumination patterns also can comprise for example a rainbow scenario. In such a rainbow scenario, a color pallet is displayed along the cabin aisle, which is similar to the colors of the rainbow. One sequence (red to purple) can be displayed in various widths along the LED strip, for example can be displayed on a small section of a light strip, for example about 10 inch/25.4 cm, which is repeated to "fill" the whole cabin length with many rainbows. Alternatively, the whole cabin length can be used to display only one rainbow color sequence. This color display can be made more dynamic by letting it move through the cabin.

Furthermore the illumination pattern may be formed in such a way that a cloudy sky scenario is displayed. According to such illumination pattern, the spatial resolution of the LED strip is used to create the imagination of a cloudy sky. For that, an irregular pattern of different shades of blue and white color is emitted, preferably by means of an LED strip arranged at ceiling and side wall portions of the cabin. A slow movement and variation of the white/blue light pattern imitates the dynamic effects of a cloudy sky. The movement of the "cloud" effects can be displayed in any direction, also randomly.

A furthermore illumination pattern can be called a sunrise scenario. A standard and known in prior art mood light scenario shown by known mood lighting systems in aircraft cabins is the sunrise or sunset scenario which imitates the light effects occurring during sunset or sunrise. The intensity and color of the emitted light is varied for this purpose, for example starting with a low intensity reddish color, then rises the intensity while changing the light color to yellow and later white with high intensity. With known lighting systems, these effects can be only displayed for the whole cabin alone or cabin sections, such as business class and economy class.

According to the invention, it is possible to create the sunrise or sunset scenario much more natural, for example by creating the imagination of a real sun rising in a certain area of the cabin, displaying a bright white spot. For that, reference coordinates are defined to link the control signals for the light system to the physical light position within the cabin. This can be done by GPS data, as for example generally disclosed in US 2015/0008282 with regard to a starry sky. According to such an embodiment, light color and intensity are varied depending on the relative distance of an LED strip or LED segments to a defined coordinate origin, to create a light color and intensity transition through the cabin.

Furthermore, the illumination pattern may comprise a dynamic accent color illumination which is an enhancement for any static illumination mode. Static in this instance means that one or more colors are displayed by the lighting system without any variation or moving effects. Dynamic accent color mode adds variation effects to this static illumination mode, by spatially altering illumination intensities and light color of LED segments of the LED strip. Possible effects could be pulsation, sparkling (flashing of the single LED segments), swirling patterns, or similarly moving effects. This adds benefits to the possibility of airlines individualizing their own passenger cabins for gaining competitive advantages.

According to a second aspect of the invention, the problem stated in the introductory portion is solved by a passenger aircraft having an aircraft cabin, comprising an LED strip lighting device according to at least one of the aforementioned preferred embodiments of an LED strip lighting device according to the first aspect of the invention. It should be understood that the first and the second aspect of the invention comprise a plurality of common and shared sub-aspects and preferred embodiments which are in particular laid out in the dependent claims. In so far reference is made to the above description of the LED strip lighting device of the first aspect of the invention for detailed feature description and benefits.

According to a first preferred embodiment of the passenger aircraft, the LED strip lighting device comprises first and second LED strips, wherein the first and second LED strips are arranged at a portion of a side wall or of an overhead luggage compartment of the aircraft cabin, wherein the first and the second LED strips are controlled such that each LED segment of the first and the second LED strips emits a light in intensity and color according to the same or a different predetermined illumination pattern. According to this embodiment, the first and the second LED strips are arranged in a face-to-face manner on opposing wall portions of the cabin. In such an embodiment it is preferred that both LED strips display the same pattern in a mirrored way. For example both LED strips may display the moving spots for guiding passengers during boarding, de-boarding or emergency case. Alternatively, the illumination pattern of the two LED strips may be different or a variation of the illumination pattern of the other LED strip(s).

Furthermore, it is preferred that the LED strip lighting device comprises third and fourth LED strips, the third and fourth LED strips being arranged at the floor of the passenger cabin, wherein the third and fourth LED strips are controlled such that each LED segment of the third and fourth LED strips emits a light in intensity and color according to the same or a different predetermined illumination pattern. Such third and fourth LED strips are provided in addition or alternatively to the above-mentioned first and second LED strips. Such LED strips at the floor portion may be preferably used for guiding the passengers and the illumination pattern for the third and fourth LED strips is preferably formed with the above-mentioned guidance function for boarding, deboarding and emergency situations.

According to a third aspect of the invention the problem stated in the introductory portion is solved by a method for controlling an LED strip lighting device which is arranged in the passenger cabin of a passenger aircraft, in particular a passenger aircraft according to at least one of the above-mentioned preferred embodiments of a passenger aircraft, and which comprises at least one LED strip comprising a plurality of N independently controllable LED segments, wherein each LED segment comprises at least one red, one green and one blue, and optionally one white LED, in particular an LED strip lighting device according to the LED strip lighting device of the first aspect of the invention, the method comprising the steps of a) emitting light of a predetermined color and intensity from an (n+0) LED segment; b) switching off the (n+0) LED segment; c) emitting light of a predetermined color and intensity from an (n+1) LED segment; d) switching off the (n+1) LED segment; e) emitting light of a predetermined color and intensity from an (n+2) LED segment; and f) switching off the (n+2) LED segment. The terms (n+0) LED segment refers to a first LED segment, and the terms (n+1), (n+2) and so forth refer to LED segments which are adjacent and on-counted starting from the (n+0) LED segment into one direction. For example the (n+0) LED segment is the first LED segment of an LED strip, the (n+1) LED segment is the second LED segment of this strip and the (n+3) LED segment is the third LED segment of this strip. The LED strip comprises in total N LED segments, wherein N is an integer number.

In the meaning of this description and the claims the switching on and the switching off of an LED is to be understood as a control of the LED in such a way that its light intensity is increased or decreased, respectively. This might include a binary control action from off to on or from on to off status but may include a stepwise or stepless dimming of the light of the LED as well.

The named steps are preferably subsequently carried out with further (x+3) LED segments, wherein x stands for (n+0), (n+1), (n+2), . . . . Thus, the steps are carried out with the (n+3), (n+4), (n+5) and so forth segments until the N LED segment. Preferably the steps are carried out in the above order and subsequently after each other. According to such a method, the LED strip is controlled to display a light spot moving along the LED strip. Preferably the method is carried out such that second, third, fourth and so on light spots are moved along the light strip. Therefore, the method with the steps above is carried out, for example when the (n+5) LED segment starts for the first time emitting light, on the same time the (n+0) LED segment again switched on and the steps of above methods with steps a) to f) are carried out subsequently.

Alternatively it is preferred that the steps of the method are carried out such that the emitting of light of adjacent LED segments overlaps each other slightly, which increases the moving appearance. For that, in particular the steps b) and c), the steps d) and e) are carried out in reverse order, so that the (n+1) LED segment is first switched on and then the (n+0) LED segment is switched off. They also can be carried out substantially simultaneously. It also can be provided that a dimmer is associated with the corresponding driver units, so that the LED segments are not switched on and off in a discrete manner, but in a smartly increasing and decreasing, hence dimmed, manner. This adds to the effect of a moving light spot.

Particularly preferred is that LED segments with higher order number are arranged closer to exits of the aircraft. Thus, the N LED segment is arranged proximal to the exit, wherein the (n+0) LED segment is arranged distal to the exit. Due to this, the light spot moves into the direction of the exit and indicates to the passengers that they shall proceed moving to the exit. This enhances the safety of the aircraft.

Furthermore it is preferred that the (n+1) LED segment is controlled to emit light with the same color and intensity as the (n+0) segment. Alternatively it can be provided that the (n+1) LED segment is controlled to emit light with a higher intensity than the (n+0) LED segment. In particular this is set forth with the further LED segments, such that the (n+2) LED segment is controlled to emit light with a higher intensity than the (n+1) LED segment and so forth. Thus, the intensity of the light emitted by the respective LED segment increases with proximity to the exit. Therefore, the exits will be illuminated with higher intensity. This also enhances the safety of the aircraft.

According to a fourth aspect of the invention, the above-mentioned problem is solved by means of a software product for a micro controller of an LED strip lighting device which is arranged in the passenger cabin of a passenger aircraft and comprises at least one LED strip, comprising a plurality of N independently controllable LED segments, wherein each LED segment comprises at least four, preferably five, six or more LED selected from red, green, blue, ice blue, warm white and cold white or an other type of LED, in particular an LED strip lighting device according to the first aspect of the invention, in particular in a passenger aircraft according to the second aspect of the invention, the software product, when carried out, causes the micro controller to control the LED strip lighting device according to the method of the third aspect of the invention.

In summary, the present invention provides an LED strip lighting device which uses RGBW LED technology (red, green, blue and white LED emitted on a PCB), used in passenger aircraft cabins for general illumination and mood lighting application. Special LED controllers incorporated in the LED strip lighting device, in particular in the LED strip, allow addressing of LED segments, which preferably have a length of 1 inch/2.54 cm in the strip which makes possible to display an individual light color on each of these 1 inch/2.54 cm segments. The principle is comparable with the technology used to control an LED video wall, the LED strip acts similar to one single pixel row of such a display.

The RGBW LED light strips also include an internal LED driver status information monitoring. This enhances failure detection capabilities of the system.

As an alternative to conventional RGBW systems, the system according to the invention will offer an RGBW system with increased capabilities regarding mood lighting capabilities of aircraft cabins. Furthermore it provides the possibility of animated light effects. The system will rely on a conventional bus system but will have a special internal bus-like logic which supplies the independent 1 inch/2.54 cm sections with the correspondent control signals. The section length of 1 inch/2.54 cm is not mandatory for the design. The sections can also be more or less than 1 inch/2.54 cm in length. Anyway, the smallest controllable section will consist of one single LED and may preferably consist of four, five, six or even more LED chips (one of each color red, green, blue and optionally ice blue, warm white, cold white). They can either be packaged in one RGB LED and one white LED, or in one RGBW LED.

The key benefits are: improved mood lighting and effects capabilities of RGBW lighting systems. Possible applications are: upper class lighting applications (business jets, first class), animated color effects, e.g. moving rainbow, assisted passenger guidance in case of emergency evacuation (lights moving in direction of nearest emergency exit), and attendant call indication.

BRIEF DESCRIPTION OF THE DRAWINGS

In the following, the invention is described with respect to specific embodiments and reference is made to the accompanying drawings, in which:

FIG. 4 shows a passenger cabin of a passenger aircraft comprising an LED strip lighting device.

DETAILED DESCRIPTION

The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form of a detail shown and described herein, nor to anything less than the whole of the invention disclosed herein and as claimed as herein after. Further, the features described in the description, the drawings and the claims disclosing the invention may be essential for the invention considered alone or in combination. In particular, any reference sign in the claims shall not be considered as limiting the scope of the invention. The wording "comprising" does not exclude other elements or steps. The wording "a" or "an" does not exclude a plurality. The wording, "a number of" items, comprises also the number of one, i.e. a single item, and further numbers like two, three, four and so forth.

Figure 1:
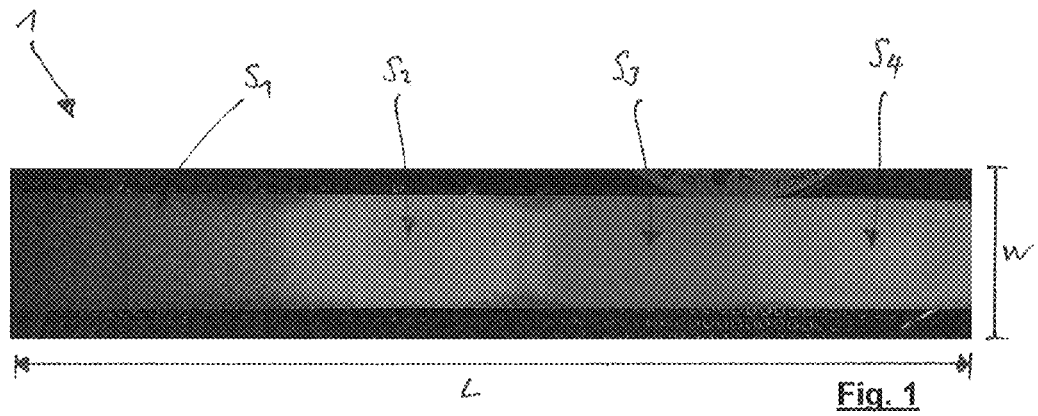
FIG. 1 shows an example of an LED strip of an LED strip lighting device when the LED segments emit light.

According to FIG. 1, an LED strip of an LED strip lighting device (see FIGS. 4-5B) according to the present invention is shown. The LED strip 1 comprises a longitudinal length L which is substantially larger than the width W. Therefore, the LED strip 1 has a strip form. The LED strip 1 can be mounted in a cabin interior of an aircraft, in particular at a wall portion, ceiling portion, and/or floor portion of the cabin (see also FIGS. 4-5B). According to this embodiment of FIG. 1, the shown LED strip comprises four segments S1, S2, S3, S4. All segments S1 to S4 each comprise a single RGBW LED element, being connected to a respective driver unit, which is not shown in FIG. 1 (see FIG. 3). According to the embodiment of FIG. 1, a rainbow scheme illumination pattern is shown, in which segment S1 is controlled to view a red color, segment S2 is controlled to emit a green color, segment S3 is controlled to emit a royal blue color and segment S4 is controlled to emit a light blue color.

Figure 2:
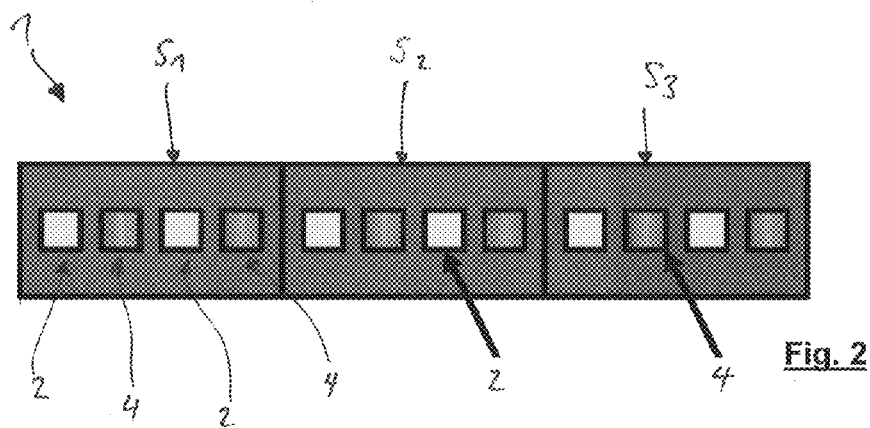
FIG. 2 shows a schematic drawing of an LED strip of an LED strip lighting device comprising three segments.

In FIG. 2, a second embodiment is shown in which the LED strip 1 comprises three segments S1, S2, S3. Each segment S1, S2, S3 according to this embodiment comprises four LED elements 2, 4 which are arranged in a row, in the direction of the longitudinal length L (see FIG. 1). Each segment S1 comprises two white LED elements 2 and two RGB elements 4. They are each arranged alternatingly to each other. Each segment S1, S2, S3 is connected to a respective driver unit which will be described with reference to FIG. 3.

Figure 3:
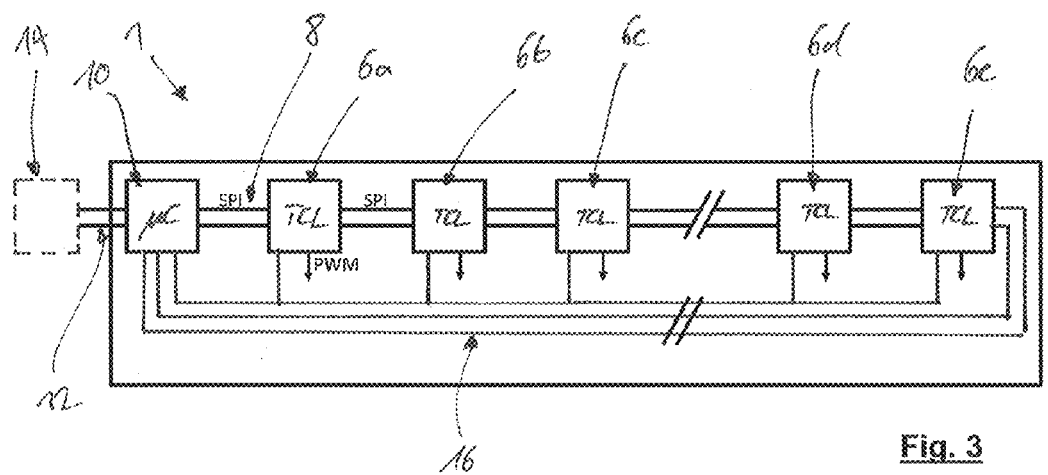
FIG. 3 shows a schematic circuit diagram of an LED strip lighting device.

FIG. 3 shows a schematic circuit diagram of an LED strip 1. Five drive units 6a, 6b, 6c, 6d, 6e are shown (in summary named with "6"). The drive units are formed as TCL driver IC units, each controlling a segment S1, S2, S3, S4. For example, drive unit 6a could be connected to segment S1 of FIG. 2, drive unit 6b could be connected to segment S2 of FIG. 2 and drive unit 6c could be connected to segment S3 of FIG. 2. Further drive units 6d, 6e could be connected to further segments of the LED strip of FIG. 2, which are not shown in FIG.

2. It is to be understood that other configurations might be preferable in other applications wherein less or more drive units are provided and/or where a drive unit controls less or more than four segments, e.g. a total of two drive units could be provided to control four segments, each drive unit controlling two segments. Each drive unit 6a to 6e provides a pulse width modulated signal (PWM) which is indicated by the lower arrow connected to each drive unit 6a to 6e. All drive units are connected to each other via an SPI bus 8, indicated by means of the two parallel lines. Furthermore, a micro controller 10 is provided which is also connected to the bus 8. Micro controller 10 stores or receives an illumination pattern and provides in accordance with this illumination pattern signals to each drive unit 6a to 6e which accordingly provide PWM signals to the LED segments S1 to S4. The micro controller 10 is connected via a serial connection line 12 with a board electronic or a higher level controller 14 which itself also is connected to micro controllers of additional LED strips of the same LED strip lighting device.

With further reference to FIG. 3, the LED strip 1 comprises a status monitoring bus 16 connecting all drive units 6a to 6c to the micro controller 10. This status monitoring bus 16 is preferably formed as an SPI bus and used for internal monitoring of the driver units 6a to 6e, in particular for failure detection and reporting. This enhances failure detection capabilities of the system.

According to FIG. 4 a schematic cut through an aircraft 20 is shown, the aircraft 20 having a cabin 22. In the cabin 22 there are shown eight seat rows 24a, 24b, 24c, 24d, 24e, 24f, 24g, 24h (in general named with "24"). The seat rows 24 are arranged on a cabin floor 26. Behind the seat rows 24 there is shown a side wall 28 having windows 30. In the center of FIG. 4 there is shown an exit 32, which also functions as an emergency exit.

The aircraft 20 comprises according to the invention an LED strip lighting device 40 which is only partially shown in FIG. 4. The LED strip lighting device 40 according to this embodiment comprises two LED strips 1, 3 which are arranged at a surface portion of an overhead luggage compartment 42, 44. The LED strips 1, 3 are arranged along a longitudinal axis of the aircraft 20. Further LED strips are arranged at the opposite side of the corridor, facing the LED strips 1 and 3. In this embodiment, the used illumination pattern is a guidance pattern, wherein light spots 46 (only two depicted with reference sign in FIG. 4) are moving in a direction. This is not physically done but only due to the illusion that the light spots 46 are moving, in that alternating the adjacent segments S1, S2, S3, S4 of the LED strip 1, 3 are switched on and off. According to FIG. 4, the moving direction of LED strip 1 is from left to the right as indicated by means of the arrow 48, towards the exit 32. Accordingly, the moving direction of light spot 46 of the LED strip 3 is from right hand side to the left side, as indicated by arrow 50 and again towards the exit 32. Thus, both LED strips 1, 3 indicate the moving direction towards the exit 32, for enhancing safety of the aircraft 20.

Figure 5A:
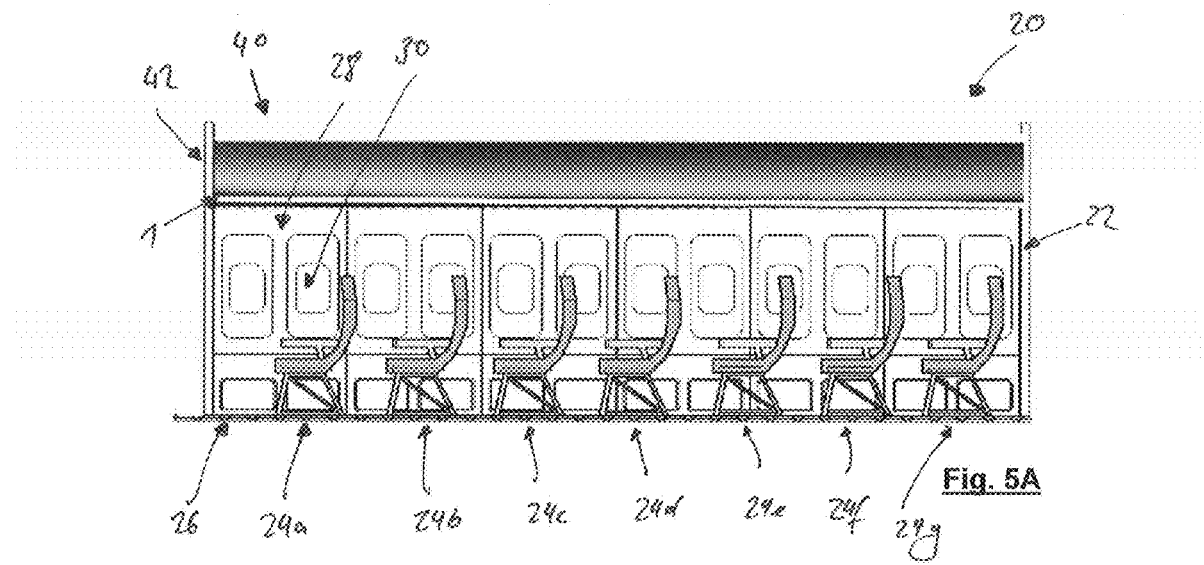
FIGS. 5A and 5B show a cabin of a passenger aircraft comprising an LED strip lighting device using a different illumination pattern.
Figure 5B:
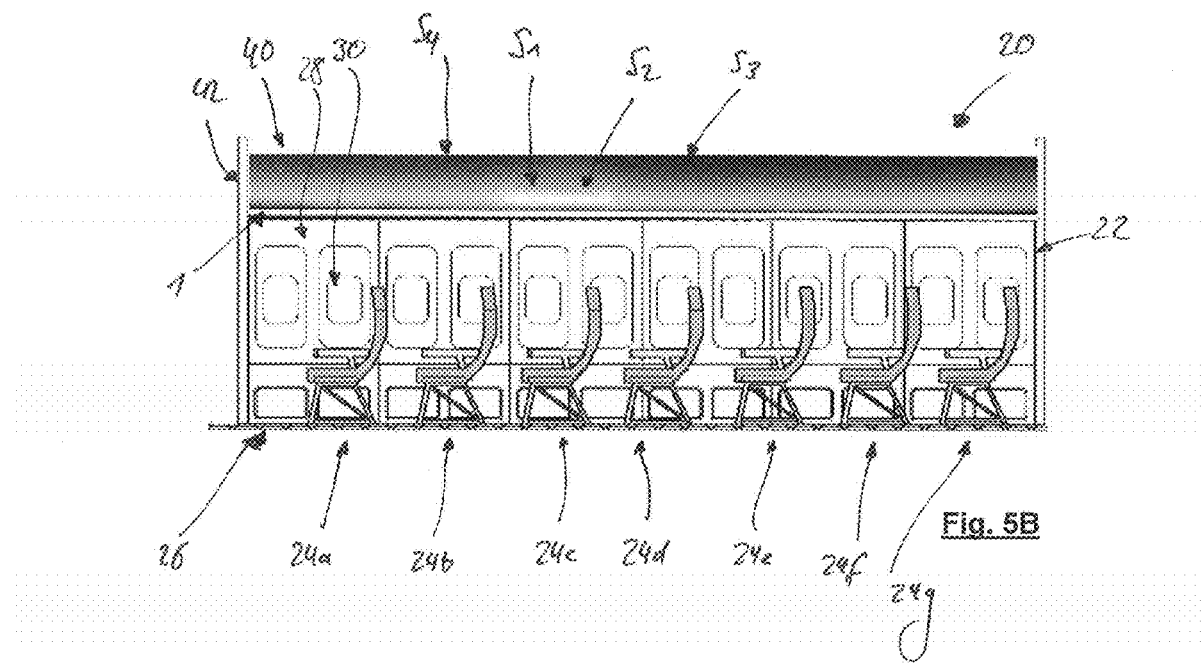

In FIGS. 5A, 5B a second embodiment of the aircraft 20 is shown. The aircraft 20 again comprises a cabin 22 in which a plurality of seat rows 24a, 24b, 24c, 24d, 24e, 24f, 24g are arranged on a cabin floor 26. At an overhead luggage compartment 42 an LED strip 1 of an LED strip lighting device 40 is arranged. The illumination pattern according to this embodiment is a cabin attendant call illumination pattern in which the micro processor 10 is provided with seat row information. In FIG. 5A the LED strip lighting device 40 is shown in idle state and no segment emits light.

In FIG. 5B, on the other hand, a person sitting in row 24c has pushed the respective cabin attendant button and this information is provided to the micro controller 10, via connection 12 and the micro controller 10 sends respective control signals to LED segments S1, S2 which may be connected to, for example, drive units 6b, 6c, so that segments S1, S2 according to FIG. 5B emit a light of a predetermined color and intensity. In this embodiment, this color is white. The neighboring LED segments S3, S4 (only two shown in FIG. 5B; it should be understood that there is a plurality of additional LED segments, which are not depicted with separate reference signs) do not emit light. According to such embodiment, a cabin attendant may easily find the seat row in which the person requiring attendance is seated.

Of course it is also possible that the LED strip lighting device 40 is formed according to both, embodiments of FIG. 4 and FIG. 5A, 5B, in that the micro controller has stored both illumination patterns or receives both illumination patterns, dependent on flight status and the current requirements. For example the illumination pattern shown in FIGS. 5A, 5B may be used during normal flight, wherein the illumination pattern shown in FIG. 4 is only used during boarding and de-boarding of the aircraft 20. The respective illumination pattern may be chosen by the cabin crew via a control terminal, or may be chosen on predetermined parameters, e.g. flight time, status of aircraft, airline requirements or the like.

The invention claimed is:

1. LED strip lighting device for a cabin of a passenger aircraft, the LED strip lighting device comprising:
at least one LED strip, comprising a plurality of N independently controllable LED segments, wherein each of the N independently controllable LED segments comprises at least four LEDs selected from red, green, blue, ice blue, warm white and cold white or another color of LED;
a plurality of M driver units, wherein each of the N independently controllable LED segments is connected to one of the plurality of M driver units for providing a control signal to the respective LED segment;
a bus system connecting each of the plurality of M driver units; and
a micro controller connected to the bus system for providing control signals for each of the plurality of M driver units such that each of the N independently controllable LED segments emits light in intensity and color according to a predetermined illumination pattern.

2. LED strip lighting device according to claim 1, further comprising a status monitoring bus that connects each of the plurality of M driver units with the micro controller.

3. LED strip lighting device according to claim 1, wherein the predetermined illumination pattern controlling each of the N independently controllable LED segments to emit light having a predetermined intensity and color includes no emission of light from a respective LED segment when an adjacent LED segment emits light, so that an appearance of a moving light spot along the at least one LED strip is achieved.

4. LED strip lighting device according claim 1, wherein the micro controller is provided with passenger seat information of the passenger aircraft and the micro controller is adapted to control the plurality of M driver units dependent on the provided passenger seat information.

5. Passenger aircraft comprising a LED strip lighting device according to claim 1.

6. Passenger aircraft according to claim 5, wherein the at least one LED strip comprises first and second LED strips, the first and second LED strips being arranged at a portion of a side wall or of an overhead luggage compartment of the cabin of the passenger aircraft, wherein the first and second LED strips are controlled such that each LED segment of the first and second LED strips emits light in intensity and color according to the same or a different predetermined illumination pattern.

7. Passenger aircraft according to claim 6, wherein the at least one LED strip comprises third and fourth LED strips, the third and fourth LED strip being arranged at a floor a cabin of the passenger aircraft, wherein the third and fourth LED strips are controlled such that each LED segment of the third and fourth LED strips emits light in intensity and color according to the same or a different predetermined illumination pattern.

8. Passenger aircraft according to claim 3, wherein a direction of the moving light spot is towards an exit of the passenger aircraft.

9. Method for controlling a LED strip lighting device which is arranged in the passenger cabin of a passenger aircraft and comprises:
   at least one LED strip, comprising a plurality of N independently controllable LED segments, wherein each LED segment comprises at least four LEDs selected from red, green, blue, ice blue, warm white and cold white or another color of LED;
   the method comprising the steps of:
a) Emitting light of a predetermined color and intensity from a (n+0) LED segment of the plurality of N independently controllable LED segments based on a control signal provided by a microcontroller to a driver unit connected to the (n+0) LED segment;
b) Switching off the (n+0) LED segment;
c) Emitting light of a predetermined color and intensity from a (n+1) LED segment of the plurality of N independently controllable LED segments based on a control signal provided by the micro controller to a driver unit connected to the (n+1) LED segment;
d) Switching off the (n+1) LED segment;
e) Emitting light of a predetermined color and intensity from a (n+2) LED segment of the plurality of N independently controllable LED segments based on a control signal provided by the micro controller to a driver unit connected to the (n+2) LED segment; and
f) Switching off the (n+2) LED segment,
   wherein the microcontroller is connected to a bus system that connects the driver units of the (n+0), (n+1), and (n+2) LED segments.

10. Method according to claim 9, wherein the steps are carried out in the above order and subsequently after each other.

11. Method according to claim 9, wherein the steps b) and c), d) and e) are carried out in reverse order.

12. Method according to claim 9, wherein LED segments with higher order numbers are arranged closer to exits of the passenger aircraft.

13. Method according to claim 9, wherein the (n+1) LED segment is controlled to emit light with the same color and intensity as the (n+0) LED segment.

14. Method according to claim 9, wherein steps a) to f) are carried out starting with at least one of a different color and a different intensity.

* * * * *